US009380148B2

United States Patent
Tang et al.

(10) Patent No.: US 9,380,148 B2
(45) Date of Patent: Jun. 28, 2016

(54) SCREEN UNLOCKING METHOD, DEVICE AND TERMINAL (71) Applicant: ZTE CORPORATION, Shenzhen, Guangdong Province (CN)

(72) Inventors: Liangjun Tang, Shenzhen (CN); Haoting Zhang, Shenzhen (CN); Wei Tong, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/417,239

(22) PCT Filed: Jun. 24, 2013

(86) PCT No.: PCT/CN2013/077749
§ 371 (c)(1),
(2) Date: Jan. 26, 2015

(87) PCT Pub. No.: WO2013/185648
PCT Pub. Date: Dec. 19, 2013

(65) Prior Publication Data
US 2015/0215444 A1 Jul. 30, 2015

(30) Foreign Application Priority Data

Aug. 2, 2012 (CN) .......................... 2012 1 0273366

(51) Int. Cl.
*H04M 1/725* (2006.01)
*G06F 3/0488* (2013.01)
(Continued)

(52) U.S. Cl.
CPC ........... *H04M 1/72577* (2013.01); *G06F 3/048* (2013.01); *G06F 3/0488* (2013.01);
(Continued)

(58) Field of Classification Search
None
See application file for complete search history.

(56) References Cited

U.S. PATENT DOCUMENTS

2008/0163119 A1 7/2008 Kim et al.
2009/0284482 A1* 11/2009 Chin .................. G06F 21/32
345/173

(Continued)

FOREIGN PATENT DOCUMENTS

CN 101436113 A 5/2009
CN 101957711 A 1/2011
(Continued)

OTHER PUBLICATIONS

The extended European search report dated Mar. 8, 2015 in EP application No. 13804603.2.
(Continued)

*Primary Examiner* — Ashish K Thomas
(74) *Attorney, Agent, or Firm* — Plumsea Law Group, LLC (57) ABSTRACT

The present document discloses a screen unlocking method, device and terminal. The method includes: acquiring a position of a lighted touch screen point on a terminal screen in a screen locking state, generating and displaying an unlocking interface corresponding to the position, wherein shortcut icons of a plurality of applications which are generated simultaneously with the unlocking interface are displayed on the unlocking interface; and in response to an unlocking request input on the unlocking interface, executing an unlocking operation; or in response to an application request corresponding to the shortcut icon input on the unlocking interface, running an application corresponding to the shortcut icon. Through the present document, the user's experience in the unlocking operation can be enhanced, meanwhile, in the unlocking process, the corresponding application can be entered, which provides the user's operation with convenience, thus achieves an effect of improving the user's experience in the unlocking operation.

13 Claims, 4 Drawing Sheets (51) Int. Cl.
*G06F 21/31* (2013.01)
*G06F 3/048* (2013.01)

(52) U.S. Cl.
CPC ........ *G06F 3/04883* (2013.01); *G06F 3/04886* (2013.01); *G06F 21/31* (2013.01); *H04M 1/72583* (2013.01)

(56) References Cited

U.S. PATENT DOCUMENTS

| | | | |
|---|---|---|---|
| 2010/0269040 A1 | 10/2010 | Lee | |
| 2010/0306702 A1 | 12/2010 | Warner | |
| 2012/0069231 A1* | 3/2012 | Chao | G06F 3/04883 348/333.01 |
| 2012/0154301 A1 | 6/2012 | Kang et al. | |
| 2012/0174042 A1* | 7/2012 | Chang | G06F 3/04883 715/863 |
| 2012/0311499 A1* | 12/2012 | Dellinger | H04N 5/23206 715/835 |

FOREIGN PATENT DOCUMENTS

| | | |
|---|---|---|
| CN | 102043587 A | 5/2011 |
| CN | 102087585 A | 6/2011 |
| CN | 102479038 A | 5/2012 |
| CN | 102855062 A | 1/2013 |
| EP | 2472377 A2 | 7/2012 |
| EP | 2477104 A1 | 7/2012 |
| KR | 20120067445 A | 6/2012 |
| KR | 20120079379 A | 7/2012 |
| WO | 2012079530 A1 | 6/2012 |
| WO | 2012093784 A2 | 7/2012 |

OTHER PUBLICATIONS

The extended European search report dated Aug. 3, 2015 in EP application No. 13804603.2.

Office Action from corresponding Korean Application No. 10-2015-7002813 issued Feb. 2, 2016, 6 Pages.

* cited by examiner

SCREEN UNLOCKING METHOD, DEVICE AND TERMINAL

CROSS-REFERENCE TO RELATED APPLICATION(S)

This application is the U.S. National Phase application of PCT application number PCT/CN2013/077749 having a PCT filing date of Jun. 24, 2013, which claims priority of Chinese patent application 201210273366.7 filed on Aug. 2, 2012, the disclosures of which are hereby incorporated by reference.

TECHNICAL FIELD

The present document relates to a field of communication, and in particular, to a screen unlocking method, device or terminal.

BACKGROUND OF THE RELATED ART

With the development of mobile communication technology and with the continuous improvement of people's living standards, the usage of a variety of mobile communication terminals, such as cell phones, is becoming increasingly popular; cell phones have become indispensable communication tools to people's lives. With the gradual popularization of the usage of the cell phones, the screen unlocking method for the cell phones appears growing diversity: a key phone unlocks the screen through key combination; but the currently popular touch-screen phone carries out the touch-screen operation in accordance with a fixed track, and moves the unlocking element to the target area, and fills the empty area and so on. The touch-screen cell phones have integrated a number of sensors, such as pressure sensors, accelerometers, gyroscopes, etc., these sensors can capture some actions of a user to feedback to the cell phone.

Thus it can be seen that, the present screen unlocking methods for the mobile phones are mostly based on determining a specific shape, a particular path, a particular position on the screen, or elements outside the screen, so as to implement the unlocking operation. These modes of unlocking screen appear more rigid, the user's operation and experience have also been limited, which cause inconvenience to the user.

With respect to the problem of causing inconvenience to the user due to an inflexible way of unlocking the screen, no effective solution has been provided yet.

SUMMARY

The present document provides a screen unlocking method, device or terminal, in order to resolve at least above problems.

In accordance with one aspect of the present document, a screen unlocking method is provided, comprising: acquiring a position of a lighted touch screen point on a terminal screen in a screen locking state, generating and displaying an unlocking interface corresponding to the position, wherein shortcut icons of a plurality of applications which are generated simultaneously with the unlocking interface are displayed on the unlocking interface; and in response to an unlocking request input on the unlocking interface, executing an unlocking operation; or in response to an application request corresponding to the shortcut icon input on the unlocking interface, running an application corresponding to the shortcut icon.

The unlocking interface comprises one of: a circular interface and a fan-shaped interface.

The step of generating and displaying an unlocking interface corresponding to the position comprises: acquiring a distance between a coordinate of the position and a centre coordinate of the screen; constructing a circular area or fan-shaped area with a radius of R according to the distance and a preset mathematical algorithm, wherein R is less than or equal to half of a width of the screen; and filling the shortcut icons of the plurality of applications which are generated simultaneously with the unlocking interface into the circular area or fan-shaped area, to construct and display the unlocking interface.

The method further comprises generating the shortcut icons of the plurality of application by means of: reading existing applications stored in the terminal, and selecting the plurality of applications from the existing applications; and sorting the plurality of applications according to a user's access frequency in a preset access period in a descending order from large to small, and generating the shortcut icons of the plurality of applications.

The method further comprises generating the shortcut icons of the plurality of application by means of: reading existing applications stored in the terminal, sorting the existing applications according to a user's access frequency in a preset access period in a descending order from large to small; and selecting, from front to back, the plurality of applications from the sorted existing applications, and generating the shortcut icons of the plurality of applications.

A number of shortcut icons which can be displayed on the circular interface is greater than a number of shortcut icons which can be displayed on the fan-shaped interface, and the number of shortcut icons which can be displayed on the fan-shaped interface is reduced with decrease of a central angle of a fan shape corresponding to the fan-shaped interface.

According to another aspect of the present document, a screen unlocking device is provided, comprising: a generation module, configured to acquire a position of a lighted touch screen point on a terminal screen in a screen locking state, generate and display an unlocking interface corresponding to the position, wherein shortcut icons of a plurality of applications which are generated simultaneously with the unlocking interface are displayed on the unlocking interface; and an execution module, configured to, execute an unlocking operation in response to an unlocking request input on the unlocking interface; or run an application corresponding to the shortcut icon in response to an application request corresponding to the shortcut icon input on the unlocking interface.

the unlocking interface comprises one of: a circular interface and a fan-shaped interface.

The generating module comprises: an acquirement unit, configured to acquire a distance between a coordinate of the position and a centre coordinate of the screen; a construction unit, configured to construct a circular area or a fan-shaped area with a radius of R according to the distance and a preset mathematical algorithm, wherein R is less than or equal to half of a width of the screen; and a generation unit, configured to fill the shortcut icons of the plurality of applications which are simultaneously generated with the unlocking interface into the circular area or the fan-shaped area, to construct and display the unlocking interface.

The generating unit comprises: a first selection unit, configured to read existing applications stored in the terminal, and select the plurality of applications from the existing applications; and a first sort unit, configured to sort the plurality of applications according to a user's access frequency in a preset access period in a descending order from large to small, and generate the shortcut icons of the plurality of applications.

The generating unit comprises: a second sort unit, configured to read the existing applications stored in the terminal, sort the existing applications according to a user's access frequency in a preset access period in a descending order from large to small; and a second selection unit, configured to select, from front to back, the plurality of applications from the sorted existing applications, and generate the shortcut icons of the plurality of applications.

A number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a corresponding fan shape of the fan-shaped interface.

According to a further aspect of the present document, a terminal is provided which comprises the foregoing screen unlocking device.

Through the present document, following operations are adopted: according to the position of a touch screen point lighted by a user on a screen, according to an algorithm stored in advance, automatically generating the screen unlocking interface, and according to a further input request from a user, performing the unlocking operation or calling the applications, and the problem of causing inconvenience to the user due to an inflexible way of unlocking the screen in the related art is solved. The user's experience in the unlocking operation can be enhanced, meanwhile, in the unlocking process, the corresponding application can be entered, which provides the user's operation with convenience, and thus achieves an effect of improving the user's experience in the unlocking operation.

BRIEF DESCRIPTION OF THE DRAWINGS

The drawings as described herein are used to provide a further description to the present document, and constitute a part of the present application. The illustrative embodiments and description thereon in the present document are used for explaining the present document, and would not improperly limit the present document, wherein.

PREFERRED EMBODIMENTS OF THE INVENTION

The present document is described in detail by referring to accompanying figures in combination with the embodiments. It should be illustrated that the embodiments in the present application and features in the embodiments can be combined with each other in a case of no conflict.

Figure 1:
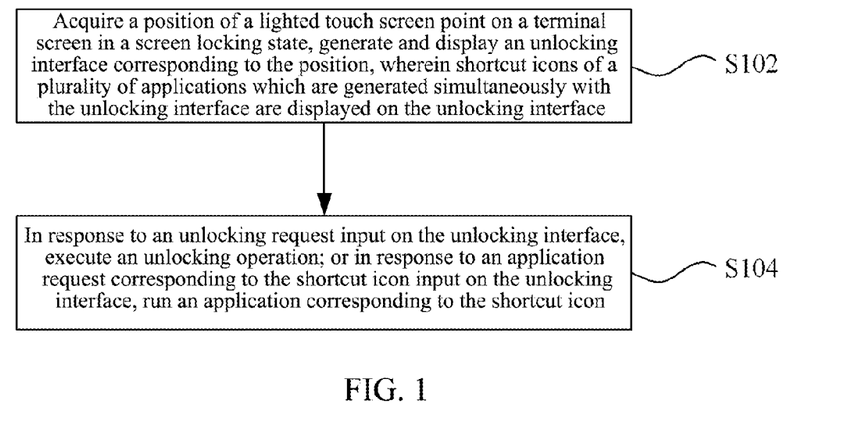
FIG. 1 is a flowchart of a screen unlocking method according to an embodiment of the present document.

FIG. 1 is a flowchart of a screen unlocking method according to an embodiment of the present document, as shown in FIG. 1, the method mainly comprises the following steps (step S102-step S104):

In step S102, a position of a lighted touch screen point on a terminal screen in a screen locking state is acquired, an unlocking interface corresponding to the position is generated and displayed, wherein shortcut icons of a plurality of applications which are generated simultaneously with the unlocking interface are displayed on the unlocking interface;

In step S104, in response to an unlocking request input on the unlocking interface, an unlocking operation is executed; or in response to an application request corresponding to the shortcut icon input on the unlocking interface, an application corresponding to the shortcut icon is run.

In the present embodiment, the unlocking interface comprises one of: a circular interface and a fan-shaped interface.

In step S102 of the present embodiment, when generating and displaying an unlocking interface corresponding to the position, the following way can be adopted: firstly acquiring a distance between a coordinate of the position and a centre coordinate of the screen in advance; secondly constructing a circular area or a fan-shaped area with a radius of R according to the distance and a preset mathematical algorithm, wherein R is less than or equal to half of the width of the screen; and finally filling the shortcut icons of the plurality of applications simultaneously generated with the unlocking interface into the circular area or the fan-shaped area, to construct and display the unlocking interface.

In step S102 of the present embodiment, preferably, the process of generating the shortcut icons of the plurality of application comprises: reading existing applications stored in the terminal, and selecting a plurality of applications from the existing applications; and sorting the plurality of applications according to a user's access frequency in a preset access period in a descending order from large to small, and generating the shortcut icons of the plurality of applications.

In the present embodiment, the number of shortcut icons which can be displayed on the circular interface is greater than the number of shortcut icons which can be displayed on the fan-shaped interface, wherein the number of shortcut icons which can be displayed on the fan-shaped interface is reduced with decrease of a central angle of a corresponding fan shape of the fan-shaped interface.

In practical applications, the above screen unlocking method can be widely applied to various terminals having a touch screen, such as a mobile terminal, especially it is suitable for a touch screen phone of the mobile terminals. The above screen unlocking method will be introduced below by taking the example of the touch screen phone; an unlocking process for the touch screen phone is as follows:

1. After a user lights a phone screen, the user's figures touch the screen. Meanwhile, a circular unlocking interface or fan-shaped unlocking interface is generated around the touch screen point touched by the figures. The specific shape of the unlocking interface is determined by the particular position of a user touch screen point.

2. The shortcut icons of some applications are generated dynamically on the circular unlocking interface or fan-shaped unlocking interface, for example, a circular dynamic interface may display eight shortcut icons of the applications; a semi-circle dynamic interface may display five shortcut icons of the applications; a quarter of the circular dynamic interface may display three shortcut icons of the applications. The specific number of shortcut icons of the applications varies with a change on the shape of the unlocking interface.

3. The shortcut icons of the applications are sorted according to a certain algorithm criterion. The specific algorithm criterions refer to algorithm criterions shown in the specific embodiments.

4. When the user touches the screen, an unlocking interface would be generated around touch screen points, and there are shortcuts of the applications on the unlocking interface. The user simply slides its finger to any application shortcut icon, the phone screen will be automatically unlocked, and the application corresponding to the shortcut icon will be entered. If the user only intends to unlock the screen, but not to enter the corresponding application, the user just long touches the screen to unlock.

With the screen unlocking method, a circular or fan-shaped interface can dynamically be generated on the screen of the terminal, the shortcut icons of the applications can be dynamically generated on the circular or fan-shaped interface, and the shortcut icons of the applications are sorted according to a certain algorithm criterion. As long as the user touches the screen and meanwhile slides her or his finger (fingers) to any shortcut icon of the applications, the user can achieve the screen unlocking and enter the application.

The screen unlocking method provided by the foregoing embodiment is described in detail in combination with FIGS. 2-4, FIG. 7 and preferable embodiments.

Figure 2:
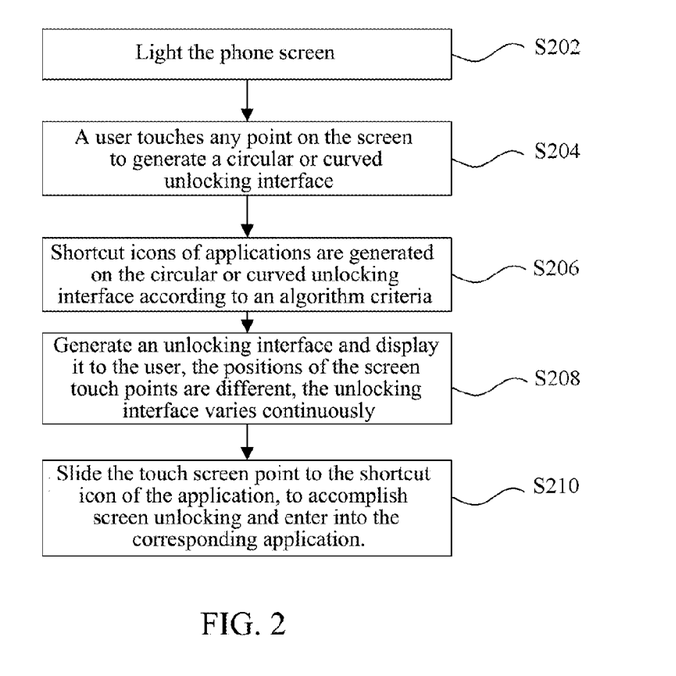
FIG. 2 is a flowchart of generating dynamically a screen unlocking interface according to a preferable embodiment of the present document.
Figure 3:
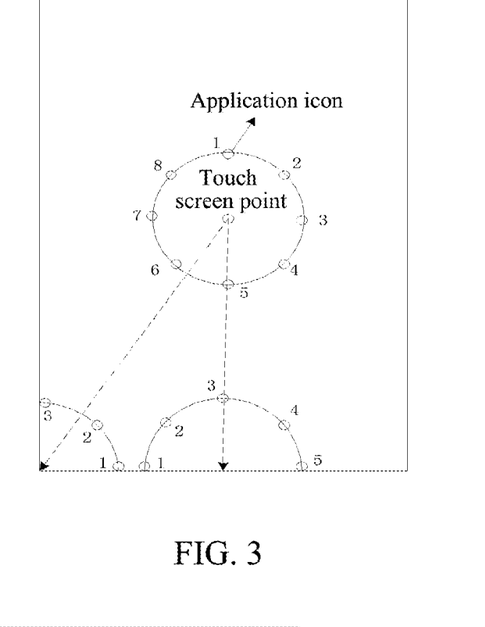
FIG. 3 is an illustrative diagram of generating a circular or fan-shaped unlocking interface according to a preferable embodiment of the present document.

FIG. 2 is a flowchart of generating dynamically a screen unlocking interface according to a preferable embodiment of the present document, as shown in FIG. 2. The generation process mainly comprises the following steps:

In step S202, it is to detect that a screen is lighted by a user in a locking state;

In step S204, it is to dynamically generate a circular or fan-shaped unlocking interface according to differences of positions of user touch screen points. FIG. 3 is an illustrative diagram of generating a circular or fan-shaped unlocking interface according to a preferable embodiment in the present document. The process of generating a circular or fan-shaped unlocking interface in step S204 is further described below in combination with FIG. 3:

(1) A length of the phone screen can be set as L, a width can be set as W, a radius of a circular or fan-shaped unlocking interface is R=W/4. Taking the length and width of the phone screen as a coordinate, a coordinate of the center point of the phone screen is (W/2, L/2).

(2) According to a distance d between a coordinate of the touch screen point and a centre coordinate of a phone screen, with a corresponding mathematical algorithm, taking a touch screen point at the different position as a centre, an area of the phone screen which is filled by a circle or a fan-shape drawn with a radius of R is Si. The filled area of the whole circle is set as S1, an area of the semicircle as S2.

(3) When Si is equal to S1, the circle unlocking interface is displayed; and it is arranged that such circle unlocking interface comprises eight application shortcut icons. When S2≤Si<S1, the unlocking interface is displayed as a semi-circle or a fan shape between a circle and a semicircle; and it is arranged that five application shortcut icons are displayed on the interface. When Si<S2, a small fan shape is displayed; and it is arranged that three application shortcut icons are displayed on the interface. We will get unlocking interfaces in different shape, such as a circle or a fan-shape, according to a difference in the filling area Si. Now please refer to FIG. 3. As shown in FIG. 3, different numbers of application shortcut icons are displayed on different areas. And the touch screen points in different positions are displayed with respect to a user' view, to derive an unlocking interface with different shapes and different numbers of shortcut icons.

Figure 4:
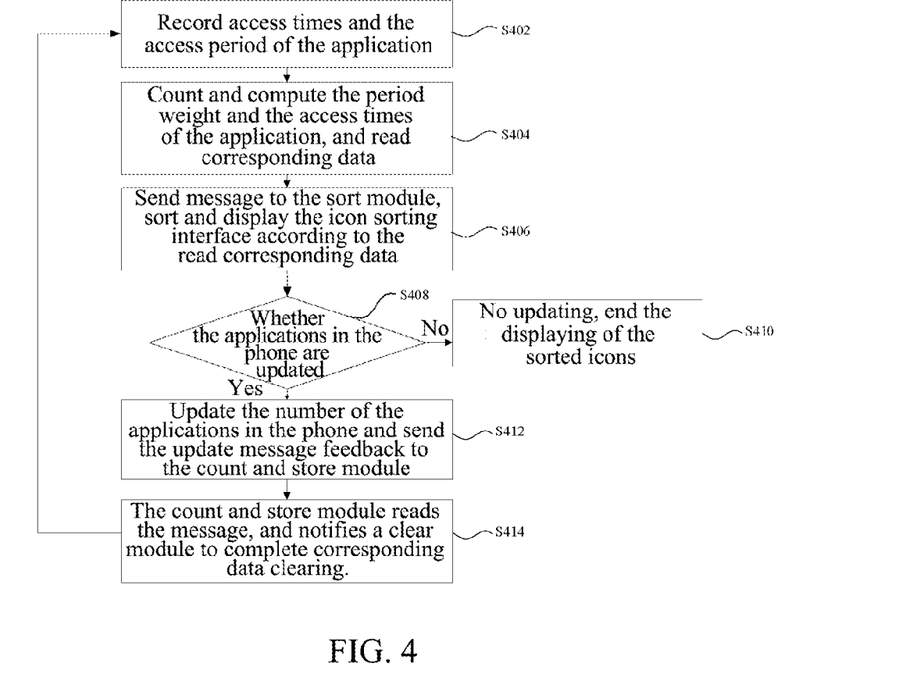
FIG. 4 is a flowchart of generating the shortcut icons of the applications according to a preferable embodiment of the present document.
Figure 7:
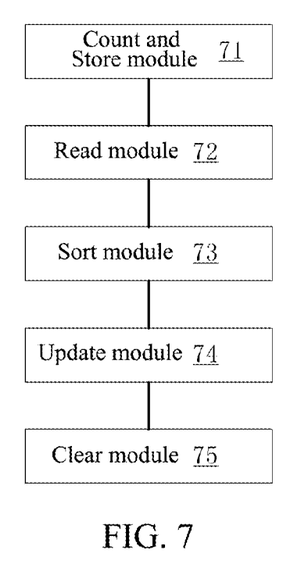
FIG. 7 is a structural diagram of a sort module through which a screen unlocking device sorts the shortcut icons of the application according to a preferable embodiment of the present document.

In Step S206, the shortcut icons on current unlocking interface are sorted according to restriction of an application usage frequency and usage time. Herein please refer to FIGS. 4 and 7. FIG. 4 is a flowchart of generating the shortcut icons of the applications according to a preferable embodiment of the present document. As shown in FIG. 4, procedures of generating the shortcut icons of the applications comprise the following steps:

In S402, access times and the access period of the application in the phone are recorded (a count and store module as shown in FIG. 7 can be used). The access times of the applications are respectively recorded as n1, n2, n3 . . . , taking the access period of the application as a weight, setting: the period T≤3, the weight μ1=0.8; 3<T≤7, μ2=0.6; 7<T≤30, μ3=0.3; T>30, μ4=0.1.

In S404, the period weight and the access times of the applications are counted and computed, and corresponding data are read.

In S406, icons are sorted according to the read corresponding data, and an icon sorting interface is displayed. On the basis of both the access times and the weight, the access frequency and period of the application in the current phone can be estimated simultaneously, the periods and access times of the applications can be sorted in sequence according to the product of the above two. Preset application icons are sorted in a clockwise direction of a circle or a fan shape, the sequence for sorting the icons is based on the product of both the access times and the access period weight, from large to small. Herein a sorting function module shown in FIG. 7 can be used for sorting the applications (the sorting function module will be further described later).

In S408, it is to detect whether the applications in the phone are updated, if the applications are updated, step S412 is executed, if the applications are not updated, step S410 is executed.

In S412, once there is new software updating in the phone, at this time, the function of updating the number of software applications in the phone is executed (an update module in FIG. 7 can be used), and an update message is reported to a count and store module (as shown in FIG. 7).

In S414, a clear module clears the access times and period data record which are recorded in the count and store module, and the count and store module is restarted to record related data.

In Step S208, a circular or fan-shaped icon unlocking interface of the applications is generated dynamically according to foregoing steps. The application icons are correspondingly sorted according to the algorithm criteria in step S206. At this time, the icons displayed in a circular interface or a fan-shaped interface are for applications which are used in a higher frequency by a phone user. Step S204 and step S206 are simultaneously completed in the sequence for generating the unlocking interface, i.e., the unlocking interface is generated, at the same time, the application icons have been already sorted on the unlocking interface sequentially. A touch screen point in a different position of the screen will display a different unlocking interface.

In Step S210, the screen unlocking interface is generated finally; a user touching the screen would generate a circular or fan-shaped interface around the touch screen point. At this time, a circular interface or a fan-shaped interface is finally displayed to the user on the screen, and the application shortcut icons are sorted on the interface according to usage habits.

With foregoing unlocking interface, the unlocking can be performed in the two following modes:

mode 1: The phone user can slide the touch screen points to any application shortcut icon, at this time, the phone will automatically achieve screen unlocking, and it can enter into the corresponding application.

mode 2: The phone user long touches the phone screen, and completes the screen unlocking without need of entering into the applications.

In practical applications, both the above two unlocking modes can be achieved completely. Currently, most touch screen phones are generally unlocked through the above two modes.

Using the screen unlocking method provided in the foregoing embodiment, a problem of causing inconvenience to the user due to an inflexible way of unlocking the screen in the related art is solved. The user's experience in the unlocking operation can be enhanced, meanwhile, in the unlocking process, the corresponding application can be entered, which provides the user's operation with convenience.

Figure 5:
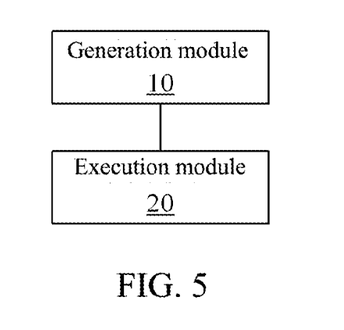
FIG. 5 is a structural diagram of a screen unlocking device according to an embodiment of the present document.

FIG. 5 is a structural diagram of a screen unlocking device according to an embodiment of the present document. The device is used to accomplish the screen unlocking provided in the foregoing embodiment. As shown in FIG. 5, the device primarily comprises: a generation module 10 and a execution module 20, wherein the generation module 10 is configured to acquire a position of a lighted touch screen point on a terminal screen in a screen locking state, generate and display an unlocking interface corresponding to the position; wherein shortcut icons of a plurality of applications which are generated simultaneously with the unlocking interface are displayed on the unlocking interface; and the execution module 20 is connected to the generation module 10 and is configured to, in response to an unlocking request input on the unlocking interface, execute an unlocking operation; or in response to an application request corresponding to a shortcut icon input on the unlocking interface, run an application corresponding to the shortcut icons.

In present embodiment, the unlocking interface can comprise one of a circular interface and a fan-shaped interface.

Figure 6:
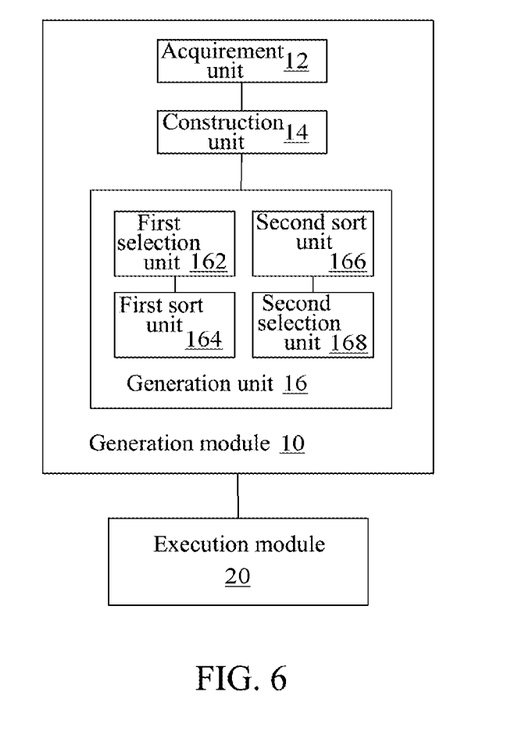
FIG. 6 is a structural diagram of a screen unlocking device according to a preferable embodiment of the present document.

FIG. 6 is a structural diagram of a screen unlocking device according to a preferable embodiment of the present document, as shown in FIG. 6. In the device provided by the preferable embodiment, the generation module 10 may comprise an acquirement unit 12, which is configured to acquire a distance between a coordinate of the position and a centre coordinate of a screen; a construction unit 14, which is connected to the acquirement unit 12 and is configured to construct a circular area or fan-shaped area with a radius of R according to the distance and a preset mathematical algorithm, wherein R is less than or equal to half of the width of the screen; and a generation unit 16, which is connected to the construction unit 14 and is configured to fill the shortcut icons of the plurality of applications simultaneously generated with the unlocking interface into the circular area or the fan-shaped area, to construct and display the unlocking interface.

In the device provided by the preferable embodiment, the generating unit 16 may comprise: a first selection unit 162, configured to read existing applications stored in the terminal, and select the plurality of applications from the existing applications; and a first sort unit 164, configured to sort the plurality of applications according to a user's access frequency in a preset access period in a descending order from large to small, and generate the shortcut icons of the plurality of applications.

In the device provided by the preferable embodiments, the generating unit 16 may comprise: a second sort unit 166, configured to read existing applications stored in the terminal, sort the existing applications according to a user's access frequency in a preset access period in a descending order from large to small; and a second selection unit 168, configured to select, from front to back, the plurality of applications from the sorted existing applications, and generate the shortcut icons of the plurality of applications.

In the preferable embodiment, the number of shortcut icons which can be displayed on the circular interface is greater than the number of shortcut icons which can be displayed on the fan-shaped interface, wherein the number of shortcut icons which can be displayed on the fan-shaped interface is reduced with decrease of a central angle of a corresponding fan shape of the fan-shaped interface.

FIG. 7 is a structural diagram of a sort module through which the shortcut icons of the application are sorted according to a screen unlocking device of a preferable embodiment in the present document. The function of the application icon sort module is primarily performed by the following modules, comprising: a count and store module 71, a read module 72, a sort module 73, an update module 74 and a clear module 75. When there is new software updating in the phone, the update module 74 will execute the function of updating the number of the softwares in the phone, and will report an update message to the count and store module 71. At last, the clear module 75 clears the access times and period data record which are recorded in the count and store module 71, and the count and store module 71 is restarted to record related data.

Of course, when an unlocking interface corresponding to a position is generated and displayed, in addition to using each corresponding module in the foregoing preferable device embodiment to accomplish, it can also be performed by separately setting a dynamical unlocking interface generating module (the module will no longer be illustrated and numbered herein due to a similar function). The dynamical unlocking interface generating module may comprise: a circular or fan-shaped interface generating module, an application shortcut icon generating module and an application shortcut icon sort module.

Figure 8:
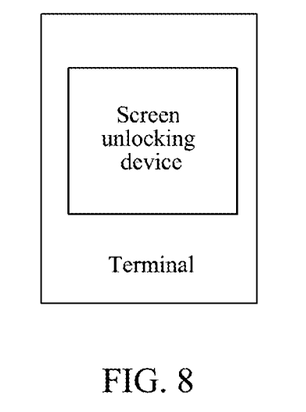
FIG. 8 is a structural diagram of a terminal comprising a screen unlocking device according to a preferable embodiment of the invention present document.

FIG. 8 is a structural diagram of a terminal comprising a screen unlocking device according to a preferable embodiment of the present document. The terminal integrates with the foregoing screen unlocking device, so as to be able to perform an unlocking operation or an operation of entering the corresponding application in a terminal screen locking state according to the foregoing screen unlocking method.

Using the screen unlocking device and the terminal integrated with the screen unlocking device provided in the foregoing embodiments, a problem of causing the inconvenience to the user due to an inflexible way of unlocking the screen in the related art is solved. The user's experience in the unlocking operation can be enhanced, meanwhile, in the unlocking process, the corresponding application can be entered, which provides the user's operation with convenience.

From the above description, it can be seen that the present document accomplishes the following technical effects:

following operations are adopted: according to the position of a touch screen point lighted by a user on a screen, according to an algorithm stored in advance, generating the screen unlocking interface; and according to a further input request from a user, performing the unlocking operation or calling the applications. With the foregoing screen unlocking method, device and terminal, a circular or fan-shaped interface can dynamically be generated on the screen of the terminal, the shortcut icons of the applications can be dynamically generated on the circular or fan-shaped interface, and the shortcut icons of the applications are sorted according to a certain algorithm criterion. As long as the user touches the screen and meanwhile slides her or his finger (fingers) to any shortcut icon of the applications, the user can achieve the screen unlocking and enter the application. With the screen unlocking method, the user's experience in the unlocking operation can be enhanced, meanwhile, in the unlocking process, the corresponding application can be entered, which provides the user's operation with convenience.

Obviously, those ordinary skilled in the art should understand that each module or each step of the above present document can be implemented by a general computing device, they can be integrated in a single computing device and distributed in a network composed of multiple computing devices, alternatively, they can be implemented by program codes executable by the computing device, thus they can be stored in the storage device to be executed by the computing device, in addition, in some cases, the steps illustrated or described here can be executed in an order which is different from the order here, or they can be made into various IC modules, or multiple modules or steps thereof can be made into a single IC module to be implemented. Thus, the present document is not limited to any specific form of the combination of hardware and software.

The above description is only for the preferred embodiments of the present document and is not used to limit the present document. For those skilled in the art, the present document can have various modifications and changes, and any modifications, equivalent replacements and improvements made within the spirit and essence of the present document should be embodied in the protection scope of the present document.

INDUSTRIAL APPLICABILITY

Comparing with related arts, with the method and device provided in the embodiments of the present document, a problem of causing inconvenience to the user due to an inflexible way of unlocking the screen in the related art is solved. The user's experience in the unlocking operation can be enhanced, meanwhile, in the unlocking process, the corresponding application can be entered, which provides the user's operation with convenience, and thus achieves an effect of improving the user's experience in the unlocking operation.

What we claim is:

1. A screen unlocking method, comprising:
    acquiring a position of a lighted touch screen point on a terminal screen in a screen locking state, generating and displaying a specific shape of an unlocking interface corresponding to the position, wherein shortcut icons of a plurality of applications which are generated simultaneously with the unlocking interface are displayed on the unlocking interface; and
    in response to an unlocking request input on the unlocking interface, executing an unlocking operation; or in response to an application request corresponding to the shortcut icon input on the unlocking interface, running an application corresponding to the shortcut icon;
    wherein the specific shape of the unlocking interface comprises one of: a circular interface and a fan-shaped interface;
    wherein the step of generating and displaying the specific shape of the unlocking interface corresponding to the position comprises:
    acquiring a distance between a coordinate of the position and a centre coordinate of the screen:
    constructing a circular area or a fan-shaped area with a radius of R according to the distance and a preset mathematical algorithm, wherein R is less than or equal to half of a width of the screen; and
    filling the shortcut icons of the plurality of applications which are generated simultaneously with the unlocking interface into the circular area or the fan-shaped area, to construct and display the unlocking interface.

2. The method according to claim 1, further comprising: generating the shortcut icons of the plurality of applications by means of:
    reading existing applications stored in the terminal, and selecting the plurality of applications from the existing applications; and
    sorting the plurality of applications according to a user's access frequency in a preset access period in a descending order from large to small, and generating the shortcut icons of the plurality of applications.

3. The method according to claim 1, further comprising: simultaneously generating the shortcut icons of the plurality of applications by means of:
    reading existing applications stored in the terminal, sorting the existing applications according to a user's access frequency in a preset access period in a descending order from large to small; and
    selecting, from front to back, the plurality of applications from the sorted existing applications, and generating the shortcut icons of the plurality of applications.

4. The method according to claim 1, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a fan shape corresponding to the fan-shaped interface.

5. The method according to claim 2, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a fan shape corresponding to the fan-shaped interface.

6. The method according to claim 3, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a fan shape corresponding to the fan-shaped interface.

7. A screen unlocking device, comprising:
    a processor;
    a generation module, implemented by the processor and configured to acquire a position of a lighted touch screen point on a terminal screen in a screen locking state, generate and display a specific shape of an unlocking interface corresponding to the position, wherein shortcut icons of a plurality of applications which are generated simultaneously with the unlocking interface are displayed on the unlocking interface; and
    an execution module, implemented by the processor and configured to execute an unlocking operation in response to an unlocking request input on the unlocking interface; or run an application corresponding to the shortcut icon in response to an application request corresponding to the shortcut icon input on the unlocking interface;

wherein the specific shape of the unlocking interface comprises one of: a circular interface and a fan-shaped interface; and wherein the generating module comprises:

an acquirement unit, implemented by the processor and configured to acquire a distance between a coordinate of the position and a centre coordinate of the screen;

a construction unit, implemented by the processor and configured to construct a circular area or a fan-shaped area with a radius of R according to the distance and a preset mathematical algorithm, wherein R is less than or equal to half of a width of the screen; and a generation unit, implemented by the processor and configured to fill the shortcut icons of the plurality of applications which are simultaneously generated with the unlocking interface into the circular area or the fan-shaped area, to construct and display the unlocking interface.

8. The device according to claim 7, wherein the generating unit comprises:

a first selection unit, implemented by the processor and configured to read existing applications stored in the terminal, and select the plurality of applications from the existing applications; and a first sort unit, implemented by the processor and configured to sort the plurality of applications according to a user's access frequency in a preset access period in a descending order from large to small, and generate the shortcut icons of the plurality of applications.

9. The device according to claim 7, wherein the generating unit comprises:

a second sort unit, implemented by the processor and configured to read the existing applications stored in the terminal, sort the existing applications according to a user's access frequency in a preset access period in a descending order from large to small; and a second selection unit, implemented by the processor and configured to select, from front to back, the plurality of applications from the sorted existing applications, and generate the shortcut icons of the plurality of applications.

10. The device according to claim 7, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a corresponding fan shape of the fan-shaped interface.

11. A terminal, characterized in that the terminal comprises the screen unlocking device in claim 7.

12. The device according to claim 8, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a corresponding fan shape of the fan-shaped interface.

13. The device according to claim 9, wherein a number of the shortcut icons which can be displayed on the circular interface is greater than a number of the shortcut icons which can be displayed on the fan-shaped interface, and the number of the shortcut icons which can be displayed on the fan-shaped interface is reduced with decrease of a central angle of a corresponding fan shape of the fan-shaped interface.

* * * * *